US009869898B2

(12) United States Patent
Nielson et al.

(10) Patent No.: US 9,869,898 B2
(45) Date of Patent: *Jan. 16, 2018

(54) WIRE GRID POLARIZER WITH DUAL ABSORPTIVE REGIONS

(71) Applicant: Moxtek, Inc., Orem, UT (US)

(72) Inventors: R. Stewart Nielson, Pleasant Grove, UT (US); Bradley R. Williams, Pocatello, ID (US); Benjamin Downard, Draper, UT (US); D. Brent Willamson, Spanish Fork, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/458,715

(22) Filed: Mar. 14, 2017

(65) Prior Publication Data
US 2017/0184898 A1  Jun. 29, 2017

Related U.S. Application Data

(63) Continuation of application No. 14/731,948, filed on Jun. 5, 2015, now Pat. No. 9,684,203.

(60) Provisional application No. 62/016,955, filed on Jun. 25, 2014.

(51) Int. Cl.
G02F 1/1335 (2006.01)
G03B 21/00 (2006.01)
G02B 5/30 (2006.01)

(52) U.S. Cl.
CPC ....... *G02F 1/13362* (2013.01); *G02B 5/3058* (2013.01); *G02F 1/133536* (2013.01); *G02F 1/133555* (2013.01); *G03B 21/006* (2013.01); *G02F 2001/133548* (2013.01)

(58) Field of Classification Search
CPC . G02B 5/3058; G02B 27/149; G02F 1/13362; G02F 1/133536; G02F 1/133555; G02F 2001/133548; G03B 21/006
USPC ............ 359/485.05, 487.03; 349/96; 353/20
See application file for complete search history.

(56) References Cited

U.S. PATENT DOCUMENTS

| 4,763,972 | A | 8/1988 | Papuchon et al. |
| 6,665,119 | B1* | 12/2003 | Kurtz ................ G02B 5/3058 353/20 |
| 7,113,335 | B2 | 9/2006 | Sales |
| 7,233,563 | B2 | 6/2007 | Ueki et al. |
| 7,414,784 | B2 | 8/2008 | Mi et al. |
| 7,961,393 | B2 | 6/2011 | Perkins et al. |
| 8,049,841 | B2 | 11/2011 | Sugita et al. |
| 9,632,224 | B2* | 4/2017 | Nielson ............. G02B 5/3058 |
| 2003/0072079 | A1 | 4/2003 | Silverstein et al. |
| 2005/0088739 | A1 | 4/2005 | Chiu et al. |
| 2006/0118514 | A1 | 6/2006 | Little et al. |

(Continued)

FOREIGN PATENT DOCUMENTS

KR  10-2012-0040869 A  4/2012
WO  WO 2015/199948 A1  12/2015

Primary Examiner — Frank Font
(74) Attorney, Agent, or Firm — Thorpe, North & Western, LLP

(57) ABSTRACT

A selectively-absorptive wire grid polarizer comprising an array of parallel, elongated rods disposed over a surface of a transparent substrate with gaps between adjacent rods, each of the rods including a reflective wire sandwiched between two absorptive ribs. A method of making this wire grid polarizer. A use of this wire grid polarizer in an image projection system.

20 Claims, 4 Drawing Sheets

(56) References Cited

U.S. PATENT DOCUMENTS

| | | | |
|---|---|---|---|
| 2007/0183025 A1* | 8/2007 | Asakawa | B82Y 20/00 |
| | | | 359/359 |
| 2007/0242352 A1 | 10/2007 | MacMaster | |
| 2008/0055723 A1 | 3/2008 | Gardner et al. | |
| 2010/0302481 A1* | 12/2010 | Baum | B29D 11/00634 |
| | | | 349/96 |
| 2012/0008205 A1 | 1/2012 | Perkins et al. | |
| 2013/0286358 A1 | 10/2013 | Takahashi et al. | |
| 2015/0077851 A1* | 3/2015 | Wang | G02B 5/3058 |
| | | | 359/485.05 |
| 2016/0062017 A1 | 3/2016 | Nielson et al. | |
| 2016/0161654 A1* | 6/2016 | Yeo | G02B 5/3058 |
| | | | 359/485.05 |
| 2017/0139095 A1* | 5/2017 | Nielson | G02B 5/3058 |

* cited by examiner

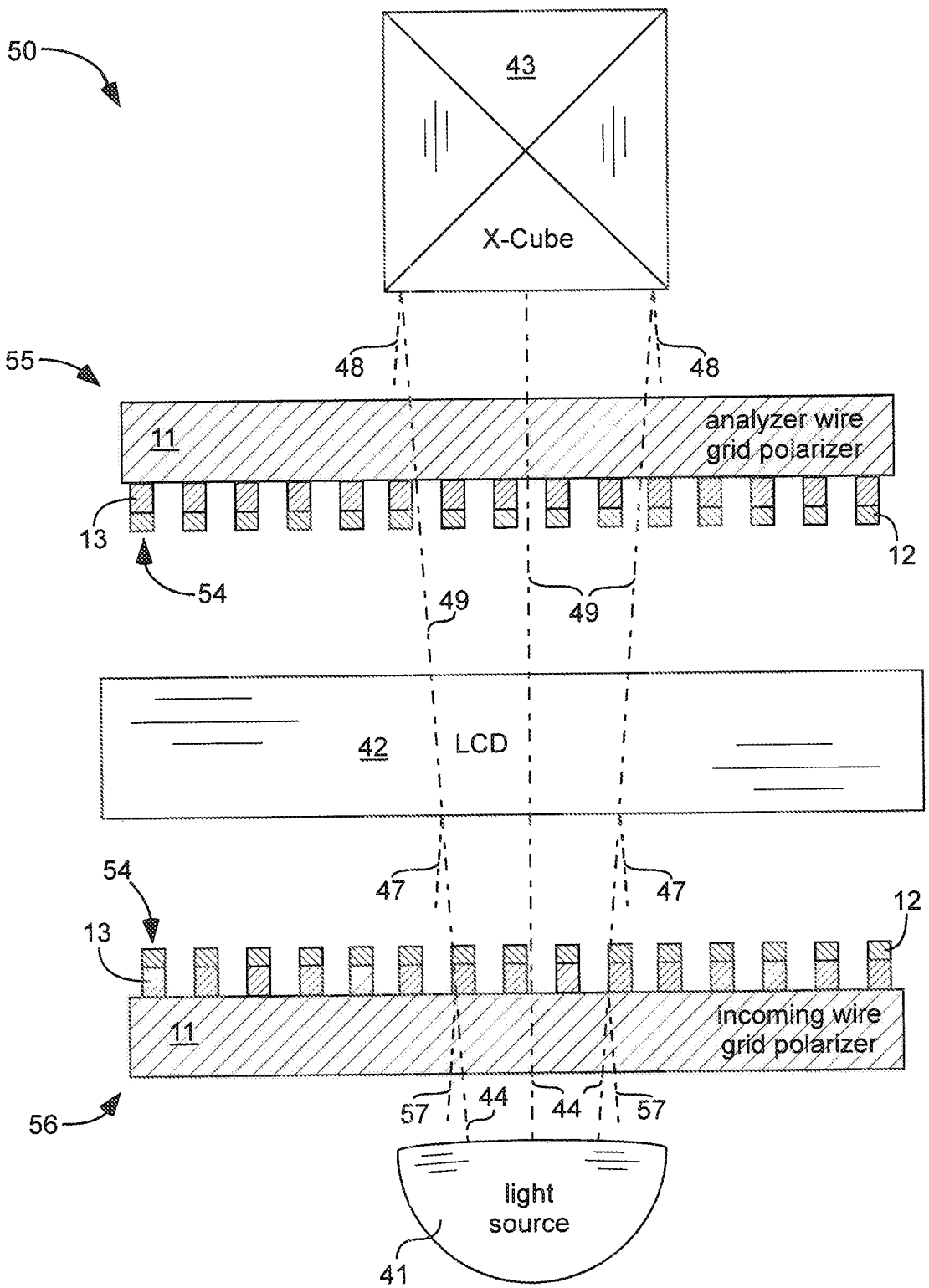
*Fig. 5 - prior art*

WIRE GRID POLARIZER WITH DUAL ABSORPTIVE REGIONS

CLAIM OF PRIORITY

This is a continuation of and claims priority to U.S. patent application Ser. No. 14/731,948, filed on Jun. 5, 2015, which claims priority to U.S. Provisional Patent Application No. 62/016,955, filed on Jun. 25, 2014, which are hereby incorporated herein by reference in their entirety.

FIELD OF THE INVENTION

The present application is related generally to selectively absorptive wire grid polarizers and image projection systems (e.g. computer projector).

BACKGROUND

Shown in FIG. 5 is an image projection system 50 comprising: (1) a wire grid polarizer (incoming wire grid polarizer) 56 sandwiched or disposed between a light source 41 and a liquid crystal display (LCD) 42; and (2) another wire grid polarizer (analyzer wire grid polarizer) 55 sandwiched or disposed between an X-Cube 43 and the LCD 42. The wire grid polarizers 55 and 56 can have an array of parallel, elongated strips 54 disposed over a surface of a transparent substrate 11. Each of the strips 54 can include a reflective wire 13 and an absorptive rib 12.

Light 44 from the light source 41 can be polarized at the incoming wire grid polarizer 56. The incoming wire grid polarizer 56 can substantially transmit one polarization (e.g. p-polarized light) and substantially reflect an opposite polarization of light 57 (e.g. s-polarized light). The reflected light 57 from the incoming wire grid polarizer 56 can adversely affect the projected image (e.g. ghosting). Light 47 reflected from the LCD 42, however, can be absorbed by the incoming wire grid polarizer 56 because the absorptive ribs 12 are disposed between the LCD 42 and the reflective wires 13.

Some of the light 44 can pass through the LCD 42 and can be further polarized at the analyzer wire grid polarizer 55. The analyzer wire grid polarizer 55 can substantially transmit one polarization (e.g. p-polarized light) and substantially absorb an opposite polarization (e.g. s-polarized light). The opposite polarization or s-polarized light can be absorbed by the analyzer wire grid polarizer 55 because the absorptive ribs 12 are disposed between the LCD 42 and the reflective wires 13. The light 44 can then reach the X-Cube 43 where light from different directions can combine and be projected. Some of the light reaching the X-Cube 43 can reflect back into the system—back towards the analyzer wire grid polarizer 55. This reflected light 48 from the X-Cube 43 can adversely affect the projected image (e.g. ghosting).

X-Cubes are sometimes called X-Cube prisms or cross dichroic prisms. X-Cubes are commonly used in computer projectors for combining different colors of light into a single image to be projected, X-Cubes are typically made of four right angle prisms, with dichroic coatings, that are cemented together to form a cube.

SUMMARY

It has been recognized that it would be advantageous to eliminate, minimize, or remove, not only light reflected from the LCD, but also light reflected from the incoming wire grid polarizer and light reflected from the X-Cube. The present invention is directed to various embodiments of wire grid polarizers that can be used to absorb reflected light from the LCD, from the X-Cube, and/or the incoming wire grid polarizer. The present invention is also directed to various methods of making such wire grid polarizers and to improved image projection systems using such wire grid polarizers.

In one embodiment, the selectively-absorptive wire grid polarizer can comprise an array of parallel, elongated rods disposed over a surface of a transparent substrate with gaps between adjacent rods, each of the rods including a reflective wire sandwiched between two absorptive ribs.

In one embodiment, a method of making a selectively-absorptive wire grid polarizer can comprise:
1. depositing a layer of absorptive material (first layer) over a surface of a transparent substrate;
2. depositing a layer of reflective material (second layer) over a surface of the first layer;
3. depositing a layer of absorptive material (third layer) over a surface of a the second layer; and
4. etching the three layers to form separate rods, the rods capable of:
   a. substantially transmitting one polarization of light; and
   b. substantially absorbing an opposite polarization of light incident on the polarizer from either of two opposite directions.

In one embodiment, an image projection system can comprise an incoming wire grid polarizer disposed between a light source and a liquid crystal display (LCD). The incoming wire grid polarizer can comprise an array of parallel, elongated rods disposed over a surface of a transparent substrate with gaps between adjacent rods. Each of the rods can have a reflective wire sandwiched between two absorptive ribs. The incoming wire grid polarizer can be disposed in a location to receive light from the light source and can substantially transmit one polarization and substantially absorb an opposite polarization of the light from the light source. The incoming wire grid polarizer can be disposed in a location to receive reflected light from the LCD and can substantially absorb the reflected light from the LCD.

BRIEF DESCRIPTION OF THE DRAWINGS

FIG. 5 is an image projection system, in accordance with the prior art.

DEFINITIONS

Figure 1:
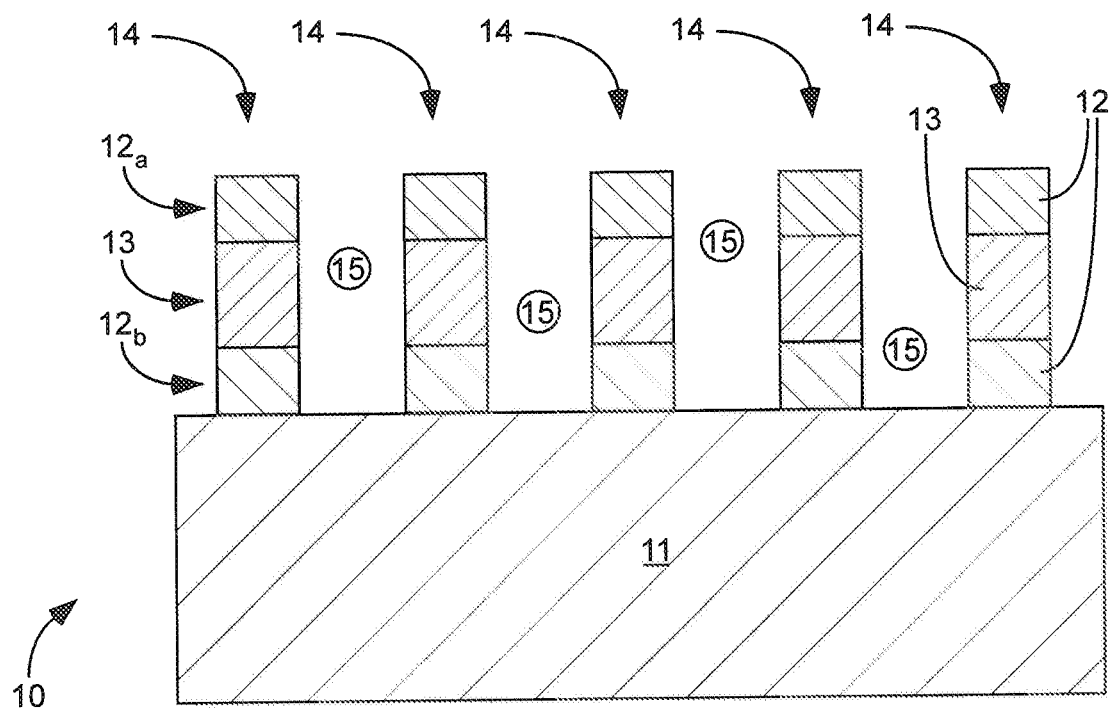
FIG. 1 is a schematic cross-sectional side view of a wire grid polarizer 10 including wires 13 sandwiched between two absorptive ribs 12, in accordance with an embodiment of the present invention.

Many materials used in optical structures absorb some amount of light, reflect some amount of light, and transmit some amount of light. The following first four definitions are intended to distinguish between materials or structures that are primarily absorptive, primarily reflective, or primarily transmissive.

1. As used herein, the term "absorptive" means substantially absorptive of light in the wavelength of interest.
   a. Whether a material is "absorptive" is relative to other materials used in the polarizer. Thus, an absorptive structure will absorb substantially more than a reflective or a transmissive structure.
   b. Whether a material is "absorptive" is dependent on the wavelength of interest. A material can be absorptive in one wavelength range but not in another.
   c. In one aspect, an absorptive structure can absorb greater than 40% and reflect less than 60% of light in the wavelength of interest (assuming the absorptive structure is an optically thick film—i.e. greater than the skin depth thickness).
   d. Absorptive ribs can be used for selectively absorbing one polarization of light.
2. As used herein, the term "reflective" means substantially reflective of light in the wavelength of interest.
   a. Whether a material is "reflective" is relative to other materials used in the polarizer. Thus, a reflective structure will reflect substantially more than an absorptive or a transmissive structure.
   b. Whether a material is "reflective" is dependent on the wavelength of interest, A material can be reflective in one wavelength range but not in another. Some wavelength ranges can effectively utilize highly reflective materials. At other wavelength ranges, especially lower wavelengths where material degradation is more likely to occur, the choice of materials may be more limited and an optical designer may need to accept materials with a lower reflectance than desired.
   c. In one aspect, a reflective structure can reflect greater than 80% and absorb less than 20% of light in the wavelength of interest (assuming the reflective structure is an optically thick film—i.e. greater than the skin depth thickness).
   d. Metals are often used as reflective materials.
   e. Reflective wires can be used for separating one polarization of light from an opposite polarization of light.
3. As used herein, the term "transmissive" means substantially transmissive to light in the wavelength of interest.
   a. Whether a material is "transmissive" is relative to other materials used in the polarizer. Thus, a transmissive structure will transmit substantially more than an absorptive or a reflective structure.
   b. Whether a material is "transmissive" is dependent on the wavelength of interest. A material can be transmissive in one wavelength range but not in another.
   c. In one aspect, a transmissive structure can transmit greater than 90% and absorb less than 10% of light in the wavelength of interest.
4. As used in these definitions, the term "material" refers to the overall material of a particular structure. Thus, a structure that is "absorptive" is made of a material that as a whole is substantially absorptive, even though the material may include some reflective or transmissive components. Thus for example, a rib made of a sufficient amount of absorptive material so that it substantially absorbs light is an absorptive rib even though the rib may include some reflective or transmissive material embedded therein.
5. As used herein, the term "light" can mean light or electromagnetic radiation in the x-ray, ultraviolet, visible, and/or infrared, or other regions of the electromagnetic spectrum.
6. As used herein, the term "sandwiched" means one item (center item) is placed between two other items (outer items), but the center item does not necessarily touch the outer items.
7. As used herein, the term "substantially absorb" does not mean that all reflected light is absorbed but rather that a significant amount is absorbed such that there is a meaningful improvement in the image projection system.

DETAILED DESCRIPTION

Wire Grid Polarizer Structure

Figure 2:
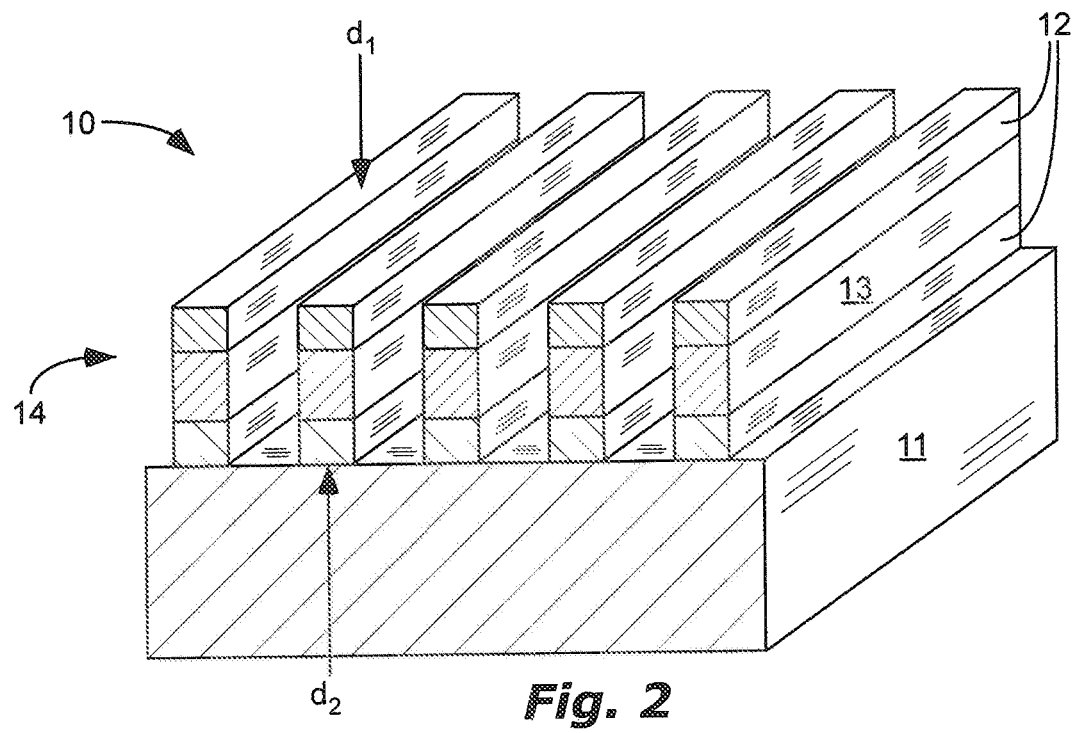
FIG. 2 is a schematic perspective view of a wire grid polarizer 10 including wires 13 sandwiched between two absorptive ribs 12, in accordance with an embodiment of the present invention.

As illustrated in FIGS. 1-2, a selectively-absorptive wire grid polarizer 10 is shown comprising an array of parallel, elongated rods 14 disposed over a surface of a transparent substrate 11 with gaps 15 between adjacent rods 14. Each of the rods 14 can include a reflective wire 13 sandwiched between two absorptive ribs 12. The gaps 15 can extend from a base, or near a base of the bottom rib 12b (i.e. rib 12 closest to the substrate) up to a top of the top rib 12a (i.e. rib 12 farthest from the substrate). The gaps 15 can be air-filled or can be filled with another material, such as for example glass or other dielectric material.

The ribs 12 can comprise any material that is sufficiently absorptive of the desired light wavelength range. In one aspect, the ribs 12 can comprise germanium, silicon, titanium, tungsten, carbon, and/or tantalum. In one aspect, the ribs 12 can comprise a mass percent of at least 80% germanium, a mass percent of at least 80% silicon, at least 80% tungsten, at least 80% carbon, at least 80% titanium, or at least 80% tantalum.

The wires 13 can be metallic—that is the wires 13 can be made of a metal (substantially pure metal or a metal alloy). In one aspect, the wires 13 can comprise aluminum, chromium, silver, and/or gold. In one aspect, the wires 13 can comprise a mass percent of at least 80% aluminum, at least 80% chromium, at least 80% silver, or at least 80% gold.

At least one of the ribs 12 can adjoin the wire 13. Alternatively, another material, such as another thin film material for improving the performance of the polarizer, can be disposed between one or both of the ribs 12 and the wire 13. The bottom rib 12b can adjoin the substrate 11, or another material, such as a thin film, can be disposed between the bottom rib 12b and the substrate. There may or may not be another material on top of the top surface of the top rib 12a.

The wires 13 and the ribs 12 can have various thicknesses, depending on the overall wire grid polarizer design. In one embodiment, the wires 13 can have thickness of between 140-220 nanometers and the ribs 12 can each have a thickness of between 10-30 nanometers. The rods 14 can have a pitch of less than half the wavelength of the incoming light. In one embodiment, the rods 14 have a pitch of between 40-160 nanometers.

The wire grid polarizer, made according to an embodiment disclosed herein, in the light wavelength range of 450 nanometers through 700 nanometers, can absorb at least 80% of one polarization of light (e.g. 5-polarized light) from both sides of the polarizer (both sides due to absorptive ribs 12 sandwiching the wires 13) and transmitting at least 80%® of an opposite polarization of light (e.g. p-polarized light). In another embodiment, the ribs 12 can absorb greater than 40% and reflect less than 60% of one polarization of light (e.g. s-polarized light) in the wavelength range of 450 nanometers through 700 nanometers. In one embodiment, the wires 13 can reflect greater than 80% and can absorb less than 20% of one polarization of light in the wavelength range of 450 nanometers through 700 nanometers.

Method of Making

Figure 3A:
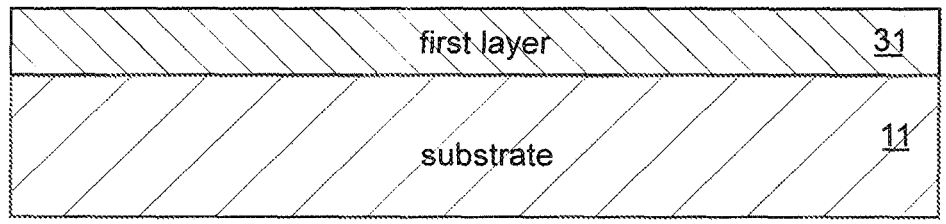
FIGS. 3a-c show steps in a method of making a wire grid polarizer, in accordance with, an embodiment of the present invention.
Figure 3B:
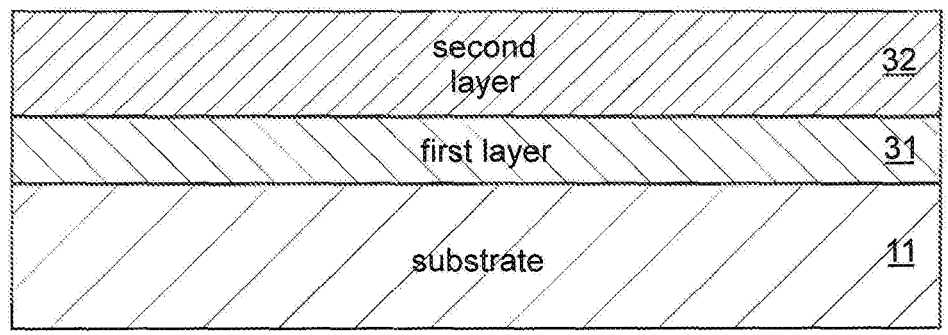
Figure 3C:
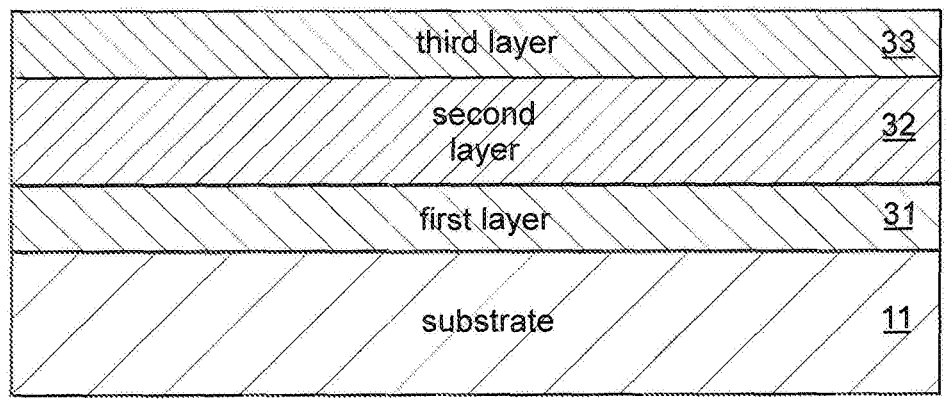

Following is a method of making a selectively-absorptive wire grid polarizer, such as for example one of the embodiments described above, including the structure and performance characteristics described above. The method can comprise the following steps, which can be performed in the order described:

1. Depositing a layer of absorptive material (first layer) 31 over a surface of a transparent substrate 11. See FIG. 3a.
2. Depositing a layer of reflective material (second layer) 32 over a surface of the first layer. See FIG. 3b.
3. Depositing a layer of absorptive material (third layer) 33 over a surface of the second layer. See FIG. 3c.
4. Etching the three layers 31-33 to form separate rods 14, the rods 14 capable of:
   a. substantially transmitting one polarization of light; and
   b. substantially absorbing an opposite polarization of light incident on the polarizer from either of two opposite directions $d_1$ and $d_2$. See FIGS. 1-2. The two opposite directions $d_1$ and $d_2$ can be perpendicular to the surface of the substrate.

Image Projection System

Figure 4:
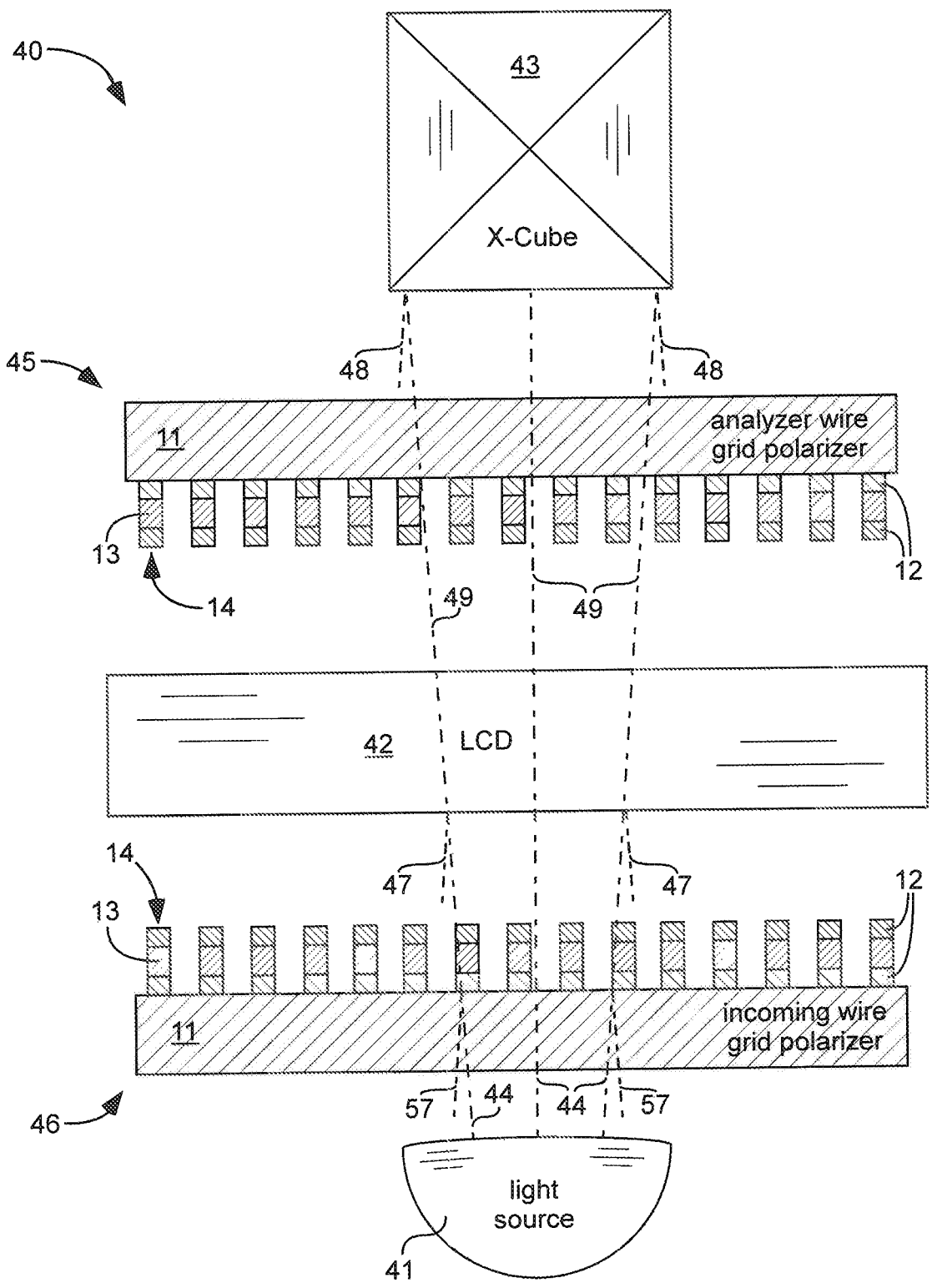
FIG. 4 is an image projection system, in accordance with an embodiment of the present invention.

Shown in FIG. 4 is an image projection system 40 comprising: (1) a wire grid polarizer (incoming wire grid polarizer) 46 disposed between a light source 41 and a liquid crystal display (LCD) 42; and (2) another wire grid polarizer (analyzer wire grid polarizer) 45 disposed between an X-Cube 43 and the LCD 42. The LCD 42 can be disposed between the wire grid polarizers 45 and 46. The incoming wire grid polarizer 46 and the analyzer wire grid polarizer 45 can have the structure and performance characteristics as wire grid polarizer 10 embodiments described above.

The incoming wire grid polarizer 46 can be disposed in a location to receive light 44 from the light source 41. The incoming wire grid polarizer 46 can substantially transmit one polarization (e.g. p-polarized light) and substantially absorb an opposite polarization (e.g. s-polarized light) of light 44 from the light source 41. The incoming wire grid polarizer 46 can be disposed in a location to receive reflected light 47 from the LCD 42. The incoming wire grid polarizer 46 can substantially absorb the reflected light 47 from the LCD 42.

The analyzer wire grid polarizer 45 can be disposed in a location to receive light 49 from the LCD 42. The analyzer wire grid polarizer 45 can substantially transmit one polarization (e.g. p-polarized light) and substantially absorb an opposite polarization (e.g. s-polarized light) of light 49 from the LCD. The analyzer wire grid polarizer 45 can be disposed in a location to receive reflected light 48 from the X-Cube 43. The analyzer wire grid polarizer 46 can substantially absorb the reflected light 48 from the X-Cube 43.

Normally, the wires of the polarizers 45 and 46 face the LCD 42, as shown in FIG. 6, but the opposite configuration, with wires facing the light source 41 and/or the X-Cube is within the scope of this invention.

The drawings herein are not to scale. A substrate 11 is typically close to a millimeter in thickness, but the rods 14 are typically much less than a micrometer in thickness, at least for polarization of visible light. Thus, to show the various elements of the polarizer, the drawings are not to scale. Also, a typical wire grid polarizer has many more wires 13 than shown, but to clearly show the structure, only a few wires 13 or rods 14 are shown in the drawings.

What is claimed is:

1. An image projection system comprising:
   a) an incoming wire grid polarizer disposed between a light source and a liquid crystal display (LCD);
   b) the incoming wire grid polarizer including an array of parallel, elongated rods disposed over a surface of a transparent substrate with gaps between adjacent rods, each of the rods including a reflective wire sandwiched between two absorptive ribs;
   c) the incoming wire grid polarizer disposed in a location to receive light from the light source and capable of substantially transmitting one polarization and substantially absorbing an opposite polarization of the light from the light source; and
   d) the incoming wire grid polarizer disposed in a location to receive reflected light from the LCD and capable of substantially absorbing the reflected light from the LCD.

2. The image projection system of claim 1, further comprising:
   a) an analyzer wire grid polarizer disposed on an opposite side of the LCD from the incoming wire grid polarizer, the analyzer wire grid polarizer comprising:
      i) a transparent substrate which is different from the transparent substrate of the incoming wire grid polarizer;
      ii) an array of parallel, elongated rods, which are different from the array of parallel, elongated rods of the incoming wire grid polarizer, disposed over a surface of a transparent substrate of the analyzer wire grid polarizer;
      iii) gaps between adjacent rods of the analyzer wire grid polarizer, each of the rods of the analyzer wire grid polarizer including a reflective wire sandwiched between two absorptive ribs; and
   b) an X-Cube disposed on an opposite side of the analyzer wire grid polarizer from the LCD.

3. The image projection system of claim 1, wherein material of the reflective wire is capable of reflecting greater than 80% of light in the visible region of the electromagnetic spectrum.

4. The image projection system of claim 1, wherein material of the two absorptive ribs are capable of absorbing more than 40% of light in the visible region of the electromagnetic spectrum.

5. The image projection system of claim 1, wherein the ribs comprise a mass percent of at least 80% silicon, at least 80% titanium, or at least 80% tantalum.

6. The image projection system of claim 1, wherein at least one of the ribs adjoins the wire in each rod.

7. A selectively-absorptive wire grid polarizer comprising an array of parallel, elongated rods disposed over a surface of a transparent substrate with gaps between adjacent rods, each of the rods including a reflective wire sandwiched between two absorptive ribs.

8. The wire grid polarizer of claim 7, wherein the wires are capable of reflecting greater than 80% and absorbing less than 20% of one polarization of light in the wavelength range of 450 nanometers through 700 nanometers.

9. The wire grid polarizer of claim 7, wherein the rods are formed by etching to form the ribs and the wires.

10. The wire grid polarizer of claim 7, wherein the ribs comprise silicon, titanium, tantalum, or combinations thereof.

11. The wire grid polarizer of claim 7, wherein the ribs comprise a mass percent of at least 80% silicon, at least 80% titanium, or at least 80% tantalum.

12. The wire grid polarizer of claim 7, wherein the wires are metallic.

13. The wire grid polarizer of claim 7, wherein at least one of the ribs adjoins the wire in each rod.

14. The wire grid polarizer of claim 7, wherein both ribs adjoin the wire on opposite sides thereof in each rod.

15. A selectively-absorptive wire grid polarizer comprising an array of parallel, elongated rods disposed over a surface of a transparent substrate with gaps between adjacent rods; each of the rods including a reflective wire sandwiched between two absorptive ribs; and the wires having a thickness of between 140-220 nanometers, the ribs have a thickness of between 10-30 nanometers, or both.

16. The wire grid polarizer of claim 15, wherein in each rod, the ribs adjoin the wire.

17. The wire grid polarizer of claim 15, wherein the ribs comprise germanium.

18. The wire grid polarizer of claim 15, wherein the rods have a pitch of between 40-160 nanometers.

19. The wire grid polarizer of claim 15, wherein the gaps are filled with a dielectric material.

20. The wire grid polarizer of claim 15, wherein: the two absorptive ribs include bottom rib closest to the substrate and a top rib farthest from the substrate; and the gaps extend from a base of the bottom rib to a top of the top rib.

\* \* \* \* \*